United States Patent [19]

Piskoti

[11] 4,092,279

[45] May 30, 1978

[54] COATING FOR RUBBER ARTICLES

[75] Inventor: Charles Piskoti, Adrian, Mich.

[73] Assignee: SWS Silicones Corporation, Adrian, Mich.

[21] Appl. No.: 675,665

[22] Filed: Apr. 12, 1976

[51] Int. Cl.$^2$ ............................................. C08L 89/00
[52] U.S. Cl. .................................... 260/8; 156/110 R; 260/17 R; 260/17.4 ST; 260/29.7 EM; 260/17.4 BB; 427/385 B; 428/494; 428/495
[58] Field of Search ............... 260/17.4 ST, 8, 17 R, 260/29.7 EM; 427/385 B; 428/495, 494; 156/110

[56] References Cited

U.S. PATENT DOCUMENTS

| Re. 23,451 | 1/1952 | Mighton | 428/494 |
| 2,499,724 | 3/1950 | Compton | 428/494 |
| 2,622,044 | 12/1952 | Martens | 427/385 B |
| 2,789,933 | 4/1957 | Bargmeyer | 428/495 |
| 3,411,982 | 11/1968 | Kavalir et al. | 428/494 |
| 3,967,014 | 6/1976 | Esemplare | 427/385 B |

*Primary Examiner*—Edward M. Woodberry

[57] ABSTRACT

Aqueous coating composition for applying to rubber articles comprising a latex binder, an emulsifying agent, a filler, a thickening agent and a compound which imparts shear stability to the composition. The composition is applied to the surface of rubber articles prior to molding to impart release properties thereto, to improve the appearance and other characteristics such as weatherability.

13 Claims, No Drawings

COATING FOR RUBBER ARTICLES

This invention relates to a coating for rubber articles, particularily to an aqueous coating composition which may be applied to rubber articles prior to molding and more particularly, to an aqueous coating composition containing a latex binder, an emulsifying agent, a filler, a thickening agent and a compound which imparts shear stability to the composition.

Heretofore, solvent based compositions have been applied to the outside surface of, for example, a green tire carcass prior to molding in order to improve its molding characteristics, aid in the removal of entrapped air and reduce the blemishes which form on the outside surface of the molded tire. One of the problems encountered in using a solvent based composition is the large amount of solvent that is released during application and vulcanization, which causes health and fire hazards. Silicone fluids have been applied to outside surfaces of a tire carcass to improve its molding characteristics; however, they do not adhere or are not compatible, i.e., they will not vulcanize with the green tire carcass and thus are easily removed.

When the composition of this invention is used in manufacturing tires, it is generally applied to the sidewall area of the green tire carcass and the carcass is then molded to the desired configuration. One of the problems encountered heretofore in tires are blemishes which appear on the sidewall of the finished tire. Another problem which has plagued the tire manufacturer is entrapped air which likewise causes blemishes on the sidewall. Moreover, the compositions which have been employed heretofore have left a residue on the mold surface which has resulted in defects on the sidewalls of the tire and as the residue builds up on the mold surface, more and more tires are rejected because of imperfections in the sidewalls. Also the compositions employed heretofore do not provide adequate air bleed characteristics, do not have sufficient lubricating properties and will flex crack upon molding. Furthermore, many of these compositions are not stable on storage and cannot be sprayed after standing for a period of time.

Therefore, it is an object of this invention to provide a composition which may be applied to rubber articles to improve their molding characteristics. Another object of this invention is to provide a composition which aids in the molding of green tire carcasses to eliminate blemishes, such as folds, "lights" (unfilled voids), knit failures and cracks on the sidewall surface of the tire. Another object of this invention is to provide a composition which is compatible with and will adhere to the tire carcass. Still another object of this invention is to provide a composition which will not flake or flex crack on the tire carcass. Still another object of this invention is to provide a composition which is stable during storage and is easily applied to the rubber surface. A further object of this invention is to provide a composition which will aid in the removal of entrapped air during molding of green tire carcasses. A further object of this invention is to provide a composition which will improve the weatherability and aging characteristics of molded rubber articles. A still further object of this invention is to provide a mold release composition which will not build up on the mold surface.

The foregoing objects and other which will become apparent from the following description are accomplished in accordance with this invention, generally speaking, by providing a mixture containing (A) from 2 to 80 percent by weight of a latex binder, (B) from 1 to 20 percent by weight of an emulsifying agent, (C) from 1 to 80 percent by weight of a filler, (D) from 0.1 to 10 percent by weight of a thickening agent and (E) from 0.05 to 10 percent by weight of a compound which imparts shear stability to the mixture. The amount of water added to the mixture may vary over a wide range depending on the solids concentration desired. Preferably the solids concentration of the resultant composition may range from about 2 to 70 percent based on the total weight of the mixture and water. The term "solids concentration" refers to the nonvolatile materials present in the composition.

The latex binder is a polymeric material dispersed in the form of small particles in a liquid, usually water. The preferred polymeric compounds are vulcanizable rubbers including natural rubber and various synthetic polymers which are made by in-situ polymerization in an emulsion state. Examples of synthetic polymers are those prepared from homopolymers of conjugated dienes such as isoprene, butadiene, 2-chlorobutadiene and copolymers thereof as well as with various monoethylenically unsaturated polymers such as styrene, dichlorostyrenes, alpha-methylstyrene, paratrifluoromethylstyrene, acrylic and methacrylic acids, esters, nitriles, amides, vinyl pyridine and the like. Especially useful are copolymers of styrene and butadiene, known as SBR and containing about 10 to 40 percent by weight of styrene and 90 to 60 percent by weight of butadiene as well as natural rubber, which is polyisoprene. Mixtures of the various homopolymers and copolymers may also be used.

These polymers and/or copolymers are used in the form of a latex which is a stabilized dispersion made by in-situ polymerization in an emulsion state, in for example, water. Typical dispersions contain about 62 to 85 percent by weight of rubber solids.

The amount of latex binder (A) present in the composition prior to dilution with water is from 2 to 80 percent and more preferably from about 5 to 60 percent by weight based on the weight of the mixture.

Various emulsifying agents may be employed in this composition to enhance the formation and/or to promote stability of the composition. Examples of suitable emulsifying agents are nonionic emulsifiers such as polyoxyethylene alkyl phenols, nonylphenoxypoly(ethyleneoxy) ethanols (available from General Aniline and Film Corporation), polyoxyethylene sorbitol hexastearate, polyoxyethylene(2mol) cetyl ether (available from Imperial Chemical Industries of America), trimethyl nonyl ether of polyethylene glycol, (molecular weight about 626, and containing from 6 to 14 ethylene oxide radicals per molecule, available as TERGITOL TMN-10 from Union Carbide Corporation), polyoxyethylene sorbitol oleate (saponification number 102–108 and hydroxyl number 25–35, available as ATLOX 1087 from Imperial Chemical Industries of America). Examples of suitable anionic emulsifying agents which may be used are sodium alkyl arylpolyether sulfonate (available as TRITON X-202 from Rohm and Haas), a partial sodium salt of a phosphate ester of an ethylene oxide adduct of a nonyl phenol containing from 4 to 10 ethylene oxide radicals per molecule (molecular weight of about 1,112 and an acid number of from 7 to 8, available as GAFAC LO-529 from General Aniline and Film Corporation) and the like. Other emulsifying agents which may be employed are salts of organic acids, having from 10 to 30 carbon atoms such as alkali metal oleates, stearates, rosinates, ammonium and amine salts of the above organic acids, such as ammonium oleate, ammonium stearate, trimethylamine oleate, trimethylamine stearate and the like.

Even though the amount of emulsifying agent is not critical, it is preferred that it be present in the composition in an amount of from 1 to 20 percent by weight and more preferably from about 2 to 10 percent by weight based on the weight of the mixture.

Fillers which may be employed in this composition are graphite, carbon black, and mineral fillers such as silicates, mica, synthetic mica, alkaline earth metal silicates, aluminum silicates, vermiculite, talc, kaolin, quartz rock and mixtures thereof. It is preferred that the mineral fillers have a particle size of from 100 to about 600 and more preferably from about 140 to about 400 mesh.

The amount of filler which may be used in this composition may range from about 1 to 80 percent and more preferably from about 20 to 60 percent by weight based on the weight of the mixture.

Various thickening agents may be added to the composition of this invention to aid in keeping the fillers in suspension. Examples of suitable thickening agents are bentonite, starch, synthetic gums and water soluble cellulose derivatives, such as sodium carboxymethylcellulose, sodium carboxymethylhydroxyethylcellulose, hydroxyethylcellulose, methylcellulose, methylhydroxypropylcellulose, ethylhydroxyethylcellulose, methylethylcellulose, methylhydroxyethylcellulose, and the like.

Although the amount of thickening agent employed in this composition is not critical, it is preferred that the composition contain at least 0.1 percent and more preferably from about 1 to about 10 percent by weight based on the weight of the mixture.

When the aqueous composition of this invention is to be continuously agitated prior to and during application, it has been found that compounds capable of forming a protective colloid should be incorporated in the composition of this invention in order to impart shear stability thereto. In the absence of these compounds, the particles tend to agglomerate and to form a heterogeneous composition. Also the composition is difficult to apply and forms a nonuniform coating on the surface, which in turn causes blemishes.

Examples of suitable compounds (E) which may be employed are caesin, ammonium caesinate, alginates, polyvinyl alcohol, guar gum, styrene maleic anhydride copolymers and mixtures thereof.

The amount of compound which is employed in the mixture of this invention may range from 0.5 to 10 percent by weight based on the weight of the mixture.

Other additives which may be included in the composition of this invention are for example hydrocarbon resins, thermoplastic block polymers such as an ABA type block polymer in which A represents polystyrene endblocks and B represents a polyolefin midblock, sold under the trademark KRATON G by Shell Chemical Company and olefinic elastomers which are obtained from the polymerization of ethylene and propylene and/or a diene to form ethylene-propylene copolymers (EPR) and ethylene-propylene diene terpolymers (EPDM). When these additives are incorporated in the composition of this invention, it is preferred that they not exceed about 20 percent by weight based on the weight of the mixture.

Additives which promote adhesion as well as antioxidants, antiozonates and pigments may be included in this composition.

Also, additives which impart lubricating properties, such as lecithin and polyglycols which have an average molecular weight of from about 400 up to about 4000, and more preferably from about 2000 to about 3000 which can be either homopolymers of ethylene or propylene glycols or copolymers of the two may be added to this composition. Other lubricants which may be used are castor oil, esters and salts of organic acids having from 10 to 30 carbon atoms, such as stearates, oleates and the like.

When thermoplastic elastomers, such as for example, KRATON G are employed in the composition of this invention, it is preferred that they be dissolved or dispersed in organic solvents. Examples of suitable organic solvents are hydrocarbon solvents such as methylcyclohexane, cyclohexane, VM&P Naphtha, mineral spirits, odorless mineral spirits, benzene, ethylbenzene, toluene and xylene. Other solvents which may be employed are esters such as isobutyl isobutyrate, methyl-n-amyl acetate, n-amyl acetate, n-butyl acetate, ethers such as tetrahydrofuran, chlorinated hydrocarbons such as carbon tetrachloride and sulfur containing solvents such as carbon dissulfide. The amount of solvent employed should be sufficient to provide a dispersion of the thermoplastic block copolymer described above.

The composition of this invention is preferably prepared by mixing the emulsifying agent, thickening agent and filler with water prior to the addition of the latex binder. Where a thermoplastic copolymer is also employed, it is preferred that it be dissolved or dispersed in sufficient organic solvent to form a dispersion and then mixed with the emulsifying agent prior to the addition of the latex binder. If desired an aqueous dispersion of, for example carbon black may be incorporated in the composition as a pigment.

Surprisingly it has been found that the composition described above has excellent storage stability, is easily sprayed and because of its thixotropic properties, will not migrate or drip when applied to the outside surface of a green tire carcass. In addition, the composition does not leave a residue on the mold surface. Moreover, when the composition of this invention is applied to the green tire carcass prior to vulcanization, the cured tire has a uniform surface appearance and is free of blemishes. Furthermore, the composition of this invention adheres to the sidewalls of the vulcanized tire and does not flake or flex crack after substantial use.

Although the composition of this invention may be applied to green tire carcasses prior to vulcanization in order to provide a tire whose sidewalls are free of defects, such as blemishes, folds, knit failures and cracks, the composition may also be applied to other rubber articles prior to molding to impart better surface appearance thereto.

Various embodiments of this invention are further illustrated in the following examples in which all parts are by weight unless otherwise specified.

EXAMPLE 1

A composition is prepared by mixing the following ingredients in the order specified in a Cowles mixer:
700 parts of water
2 parts of CARBOPOL-941 (trademark for high molecular weight carboxy vinyl polymers sold by B. F. Goodrich Chemical Company)

15 parts of ammonium caseinate (20 weight percent in water)

25 parts of trimethyl nonyl ether of polyethylene glycol containing from 6 to 14 ethylene oxide radicals per molecule (available as TERGITOL TMN-10 from Union Carbide Corporation)

After all the ingredients have been added, the composition is mixed for about 45 minutes.

About 360 parts of talc are then added to the composition over a period of about 5 minutes and mixed for an addition 45 minutes at 4000 rpm. About 114 parts of styrene-butyl rubber latex (available from Firestone Tire and Rubber Company as FRS-275) are added and mixed for 3 minutes. To the above mixture is then added 100 parts of a carbon black dispersion in water containing 40 percent carbon black and mixed for an additional 20 minutes. The resultant composition is thixotropic and may be continuously agitated 7 days without any change in viscosity. When the composition is applied to green tire carcasses, and thereafter molded, the resultant tires are free of outside surface blemishes.

EXAMPLE 2

When 15 parts of casein (20 weight percent in water) are substituted for the ammonium caseinate in the composition of Example 1, substantially identical results are obtained.

EXAMPLE 3

When an additional 200 parts of talc are added to the composition of Example 1, substantially improved air-bleeding properties are achieved.

EXAMPLE 4

When 360 parts of mica are substituted for the talc in the composition of Example 1, substantially identical results are obtained.

EXAMPLE 5

When 10 parts of lecithin are added to the composition of Example 1, the resultant composition exhibits improved mold release properties when applied to green tire carcasses.

EXAMPLE 6

When 100 parts of a 25 percent by weight solution of a styrene-ethylene butylene-styrene block polymer in toluene (sold under the trademark KRATON G by Shell Chemical Company) are added to the composition of Example 1, the molded tire exhibits substantially improved resistance to ozone.

EXAMPLE 7

When 150 parts of a 20 percent by weight solution of an ethylene-propylene diene terpolymer in hexane (available as VISTALON-6505 from Exxon Chemical Company) are added to the composition of Example 1, the molded tire exhibits substantially improved resistance to ozone.

EXAMPLE 8

When 5 parts of sodium carboxymethyl cellulose are substituted for CARBOPOL-941 in the composition of Example 1, substantially the same results are obtained.

EXAMPLE 9

In a comparison example, a composition is prepared in accordance with the procedure described in Example 1, except that the ammonium caesinate is omitted. After stirring for 7 days, a substantial increase in viscosity is observed. The composition can not be applied to a tire carcass by conventional spray equipment.

Although specific examples of the invention have been described herein, it is not intended to limit the invention solely thereto, but to include all the variations and modifications falling within the spirit and scope of the appended claims.

What is claimed is:

1. A composition for treating the outer surface of rubber articles prior to vulcanization which comprises a mixture consisting essentially of (A) from 2 to 80 percent by weight based on the weight of the mixture of a preformed latex binder selected from the class consisting of natural rubber and synthetic polymers obtained from the in-situ polymerization of emulsified monomers, said synthetic polymers are selected from the class consisting of homopolymers of conjugated dienes, copolymers of the conjugated dienes and copolymers of the conjugated dienes and monomers having monoethylenic unsaturation selected from the class consisting of styrene, substituted styrenes, acrylic and methacrylic acids, esters, nitriles and amides thereof and vinyl pyridine, (B) from 1 to 20 percent by weight of the mixture of an emulsifying agent selected from the class consisting of anionic and nonionic emulsifying agents, (C) from 1 to 80 percent by weight based on the weight of the mixture of a filler selected from the class consisting of graphite, carbon black, mineral fillers and mixtures thereof, (D) from 0.1 to 10 percent by weight based on the weight of the mixture of a thickening agent selected from the class consisting of bentonite, starch, synthetic gums and water soluble cellulose derivatives, (E) from 0.05 to 10 percent by weight based on the weight of the mixture of caesin in the form of a protective colloid and sufficient water to provide a composition having a solids concentration of from 2 to 70 percent by weight based on the weight of the mixture and water.

2. The composition of claim 1, wherein the conjugated dienes are selected from the class consisting of isoprene, butadiene and 2-chlorobutadiene.

3. The composition of claim 1, wherein latex binder (A) comprises a copolymer of from 10 to 40 percent by weight of styrene and 90 to 60 percent by weight of butadiene.

4. The composition of claim 1, wherein latex binder (A) is present in an amount of from 10 to 50 percent by weight based on the weight of the mixture.

5. The composition of claim 1, wherein emulsifying agent (B) is present in an amount of from 2 to 10 percent by weight based on the weight of the mixture.

6. The composition of claim 1, wherein filler (C) is a mineral filler having a particle size of from 100 to about 600 mesh.

7. The composition of claim 6, wherein filler (C) is present in an amount of from 20 to 60 percent by weight based on the weight of the mixture.

8. The composition of claim 1, wherein thickening agent (D) is present in an amount of from 1 to 10 percent by weight based on the weight of the mixture.

9. The composition of claim 1, wherein thickening agent (D) is a water soluble cellulosic derivative.

10. The composition of claim 1, wherein compound (E) is ammonium caseinate.

11. The composition of claim 1, which includes a thermoplastic material containing a polystyrene-polyolefin block polymer.

12. A method for molding rubber articles free of surface defects which comprises coating the outer surface of an uncured rubber with an aqueous composition consisting essentially of a mixture of (A) from 2 to 80 percent by weight based on the weight of the mixture of a preformed latex binder selected from the class consisting of natural rubber and synthetic polymers obtained from the in-situ polymerization of emulsified monomers, said synthetic polymers are selected from the class consisting of homopolymers of conjugated dienes, copolymers of the conjugated dienes and copolymers of the conjugated dienes and monomers having monoethylenic unsaturation selected from the class consisting of styrene, substituted styrenes, acrylic and methacrylic acids, esters, nitriles and amides thereof and vinyl pyridine, (B) from 1 to 20 percent by weight based on the weight of the mixture of an emulsifying agent selected from the class consisting of anionic and nonionic emulsifying agents, (C) from 1 to 80 percent by weight based on the weight of the mixture of a filler selected from the class consisting of graphite, carbon black, mineral fillers and mixtures thereof, (D) from 0.1 to 10 percent by weight based on the weight of the mixture of a thickening agent selected from the class consisting of bentonite, starch, synthetic gums and water soluble cellulose derivatives, (E) from 0.05 to 10 percent by weight based on the weight of the mixture of caesin in the form of a protective colloid and sufficient water to provide a composition having a solids concentration of from 2 to 70 percent by weight based on the weight of the mixture and water and thereafter vulcanizing the coated rubber article.

13. A vulcanized rubber article obtained from the method of claim 12.

* * * * *